July 18, 1939.  G. A. CARLSON  2,166,859

FINISHING MACHINE

Filed July 22, 1938  3 Sheets-Sheet 1

INVENTOR.
Gustave A. Carlson
BY
ATTORNEY.

July 18, 1939. G. A. CARLSON 2,166,859
FINISHING MACHINE
Filed July 22, 1938 3 Sheets-Sheet 2
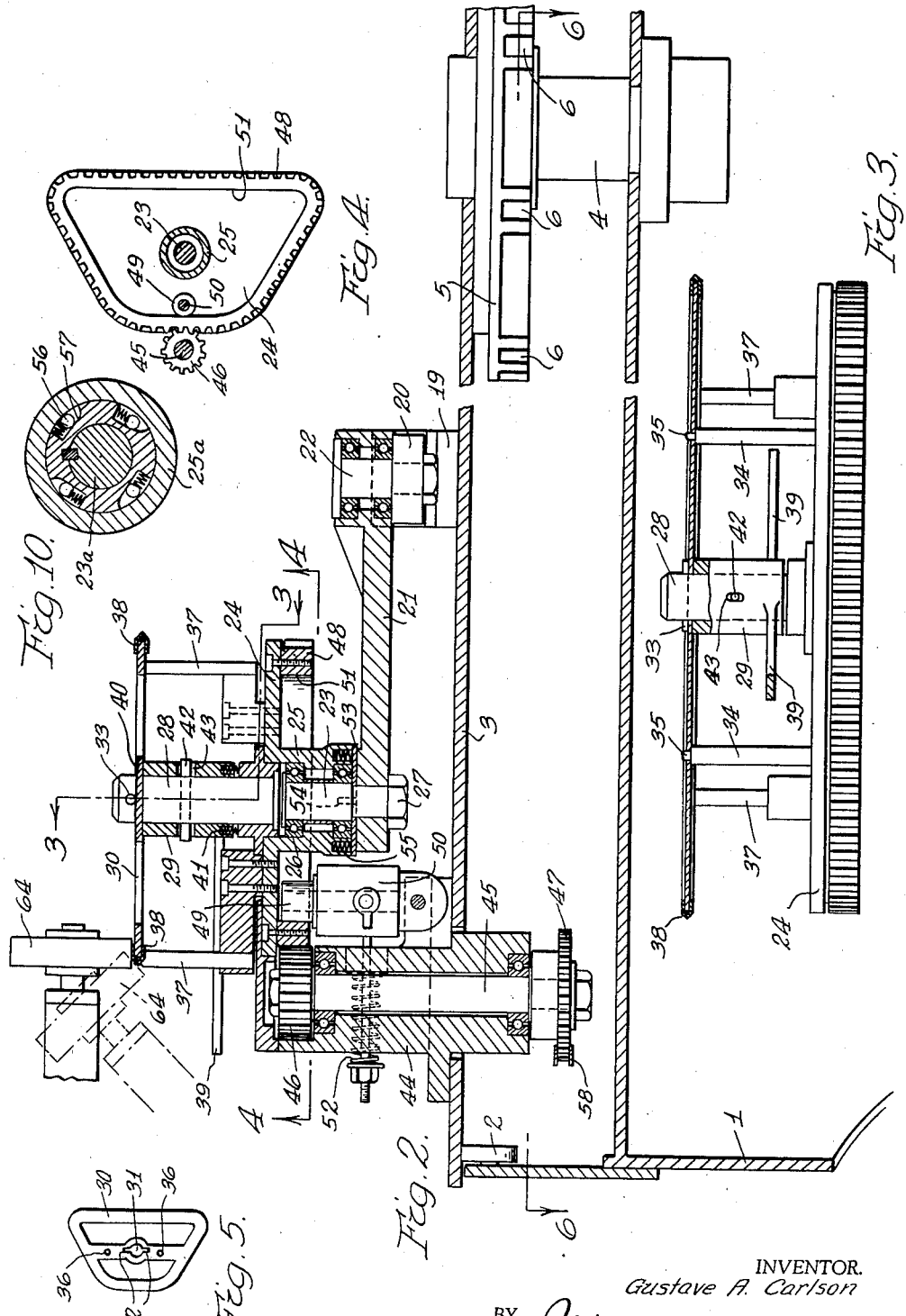
INVENTOR.
Gustave A. Carlson
BY
ATTORNEY.

July 18, 1939.  G. A. CARLSON  2,166,859
FINISHING MACHINE
Filed July 22, 1938  3 Sheets-Sheet 3

INVENTOR.
Gustave A. Carlson
BY
ATTORNEY.

Patented July 18, 1939

2,166,859

UNITED STATES PATENT OFFICE 2,166,859

FINISHING MACHINE

Gustave A. Carlson, Detroit, Mich.

Application July 22, 1938, Serial No. 220,767

20 Claims. (Cl. 51—108)

This invention relates to machines for grinding, polishing or buffing work pieces of irregular shape and has for its primary object to provide apparatus for this purpose embodying a plurality of work holders for receiving irregularly shaped frame-like members, for carrying the work pieces to a series of work stations successively, and for revolving the work holders while they are located at the work stations, about a horizontally shiftable vertical axis, to progressively present the linear surfaces of the work pieces to the work performing members.

Another object is to provide a machine of the character above mentioned having means for supporting the work holders for rotation about a vertical axis, said means being articulated whereby said axis may shift horizontally, and means for controlling horizontal shifting of said axis whereby an imaginary line passing through the entire length of a surface of the work piece passes through a given plane, regardless of variations in distance of different points in said line with respect to said axis. The surface of the work piece in which said imaginary line is located is treated by a work performing member located in said plane.

Obviously, with frame-like work pieces of other than round shape, points located at different distances from the axis of rotation all complete a revolution in the same period of time, yet actually travel different distances. It is an object of this invention to provide means for rotating the work holders whereby the linear speed of movement of all points in the surface of the work piece is constant at the point of contact with the work performing member. This means preferably comprises a driven gear, located adjacent the work performing member, and acting upon a rack having the same shape as the work piece to impel rotative movement of the work holding member.

In the case of frame-like work pieces having shapes comprised of straight and curved surfaces, in maintaining the speed of movement constant at the point of contact with the work performing members, an abrupt shifting of the axis of rotation of the work holder is incurred. As a result of this condition, the momentum of the work holder tends to cause the rack to over-run the gear and results in severe vibrations. Another object of this invention is to provide means for counter-acting the effects of momentum to eliminate a very substantial portion of such vibration.

In this respect it has been found that the provision of friction means or an over-running clutch for preventing retrograde rotation of the work holder eliminates, to a substantial degree, tendencies for the work holder to vibrate about its axis.

Another object is to provide a machine incorporating the above objects and including a table rotatable about a vertical axis and means for rotating the table periodically and for stopping and locking the table with the work holders at the work or loading stations, and means operating in timed relationship with the means for rotating the work holders for automatically rendering the locking means inoperative at the expiration of a period of time sufficient to permit one complete revolution of the work holders.

In the accompanying drawings:

Fig. 2 is a section taken on the line 2—2 of Fig. 1;

Figure 1:
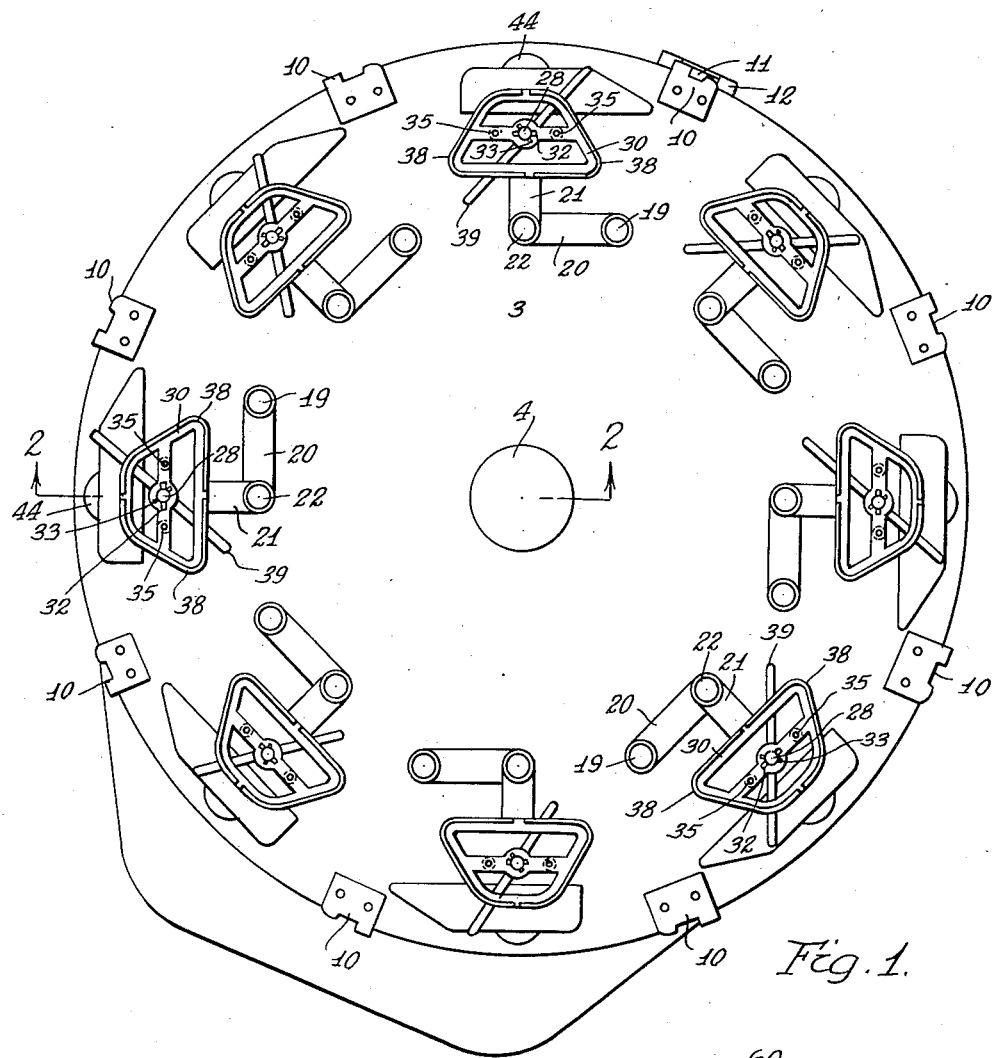
Fig. 1 is a plan view.
Figure 8:
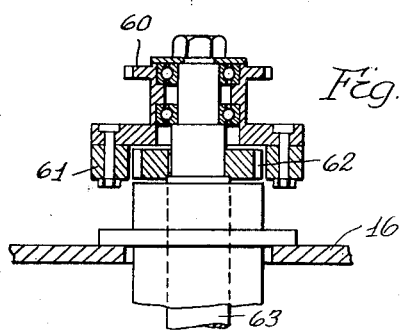
Figure 9:
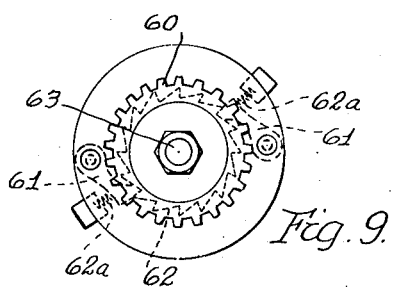
Figure 6:
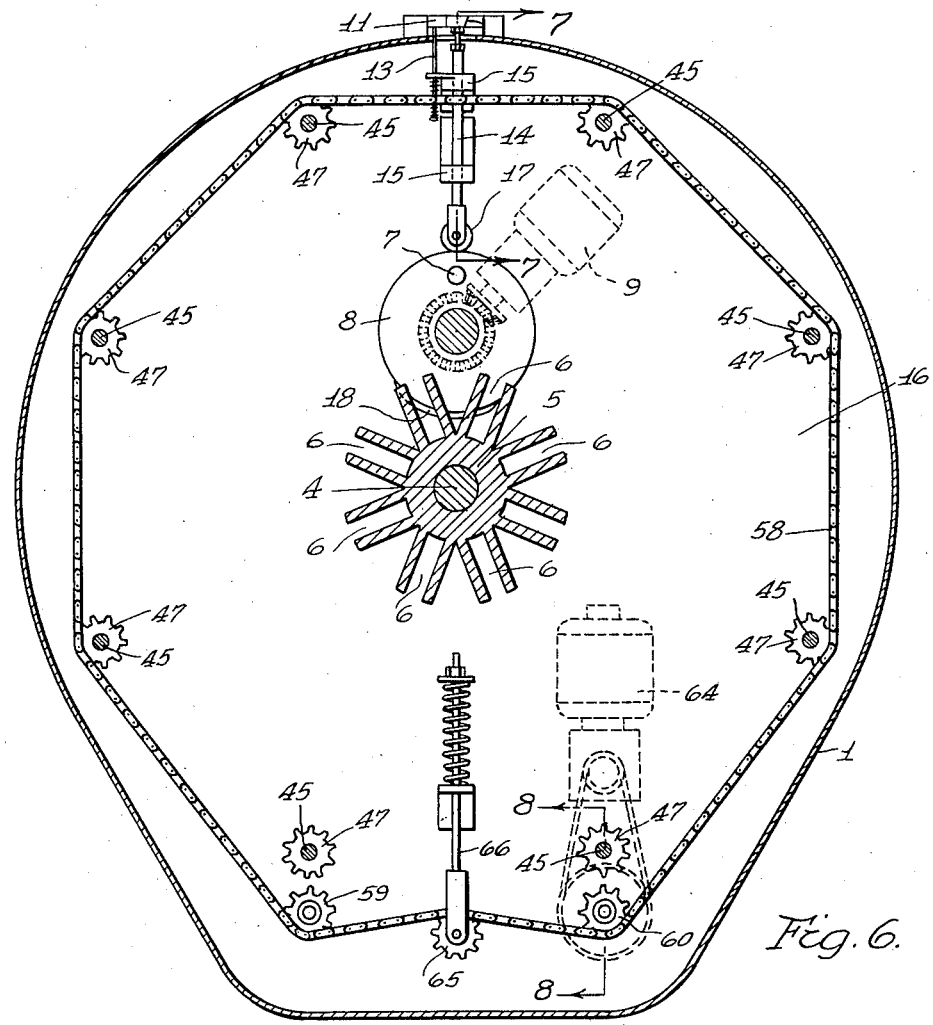
Figure 7:
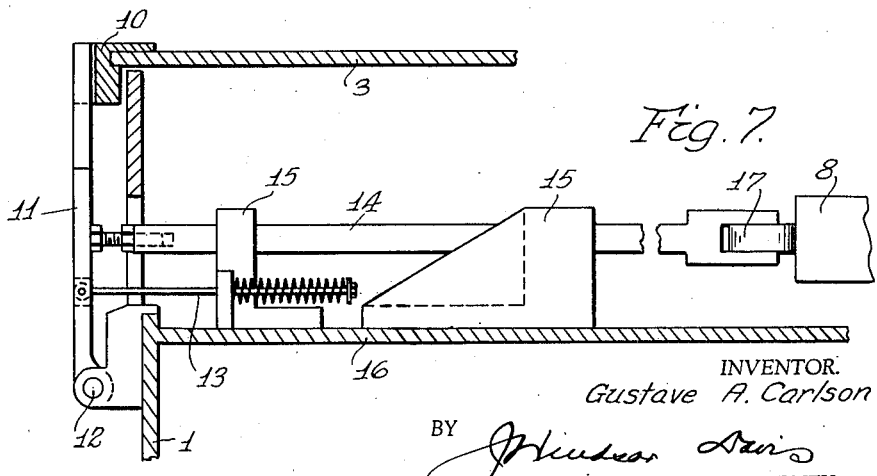

Figs. 3 and 4 are sections taken respectively on lines 3—3 and 4—4 of Fig. 2;

Fig. 5 is a plan of a work supporting member;

Fig. 6 is a section taken on the plane of line 6—6 of Fig. 2;

Fig. 7 is a section taken on the line 7—7 of Fig. 6;

Fig. 8 is a section taken on the plane of line 8—8 of Fig. 6;

Fig. 9 is a plan corresponding with Fig. 8, and

Fig. 10 is a section illustrating a modified detail.

The present machine comprises a base 1 carrying a plurality of rollers 2 which support a table 3 for rotation about a central vertical shaft 4. Secured to the table 3 is a disc 5 having a plurality of radial ways 6 with which a pin 7 on a rotatable element 8 cooperate to cause intermittent motion of the table 3 incident to rotation of the element 8. The element 8 is constantly driven by a motor 9.

Mounted at spaced intervals about the periphery of the table 3 are locking lugs 10 with which the pivoted locking member 11 cooperate to hold the table 3 against rotation. The latch member 11 is pivoted at 12 on the base 1 and has a spring pressed rod 13 normally biasing movement in a direction to engage the lugs 10. A lengthwise extensible plunger 14 is slidably supported in brackets 15 on the horizontal plate 16, which is part of the base structure, and has a roller 17 contacting the rotatable element 8. On the rotatable element 8 is a cam 18 which reciprocates the plunger 14 to pivot the latch 11 away from an engaged pair of lugs 10 as the pin 7 approaches a set of ways 6.

From the foregoing, it becomes apparent that a Geneva movement is provided for intermittently moving the table 3, and that said movement includes means for releasing the lock which holds the table stationary while the moving means is inoperative. In the instant case, there are eight sets of ways 6, in which case there are eight sets of lugs 10.

Mounted on the table 3 are a plurality of work supports, each of which comprises a member 19 supporting an arm 20 for pivotal movement about a vertical axis. A second arm 21 is connected to the free end of the arm 20 by a vertical pivot 22 and on its free end is mounted a vertical shaft 23. A plate 24, having a contour identical to the shape of the work pieces to be received, has a hub portion 25 supported on the shaft 23 by antifriction bearings, and may be removed from the arm 21 and replaced by a plate of different shape by removing the nut 27 which holds the shaft on the arm. The shape of the plate 24 varies according to the shape of the work pieces.

Carried by the plate 24 is a vertical stud 28, which is free to rotate, and which has a spring pressed sleeve 29 thereon. A work support 30 has a central opening 31 with recesses 32 and is adapted to slip over the upper end of the stud 28 and the pins 33 carried thereby. Also mounted on the plate 24 are studs 34 having reduced ends 35 adapted to project through openings 36 in the work support 30. Other studs 37 are mounted on the plate 24 to support the work support, and as may be seen in Fig. 2, some of the studs 37 also contact the work pieces 38.

The work pieces 38, in the present instance, are substantially U-shape, and are of channel section, and are slipped over opposite ends of the work support 30 while the latter is removed from the machine. The work support is then placed on the studs 28, 34 and 37, and by means of handles 39 the sleeve 29 and stud 28 are partially rotated to move the pins 33 out of alignment with the recesses 32. The work support 30 preferably has cam surfaces 40 with which the pins 33 cooperate in pressing the work support downwardly whereby it slightly compresses the springs 41 which normally urge the sleeve 29 upwardly. The sleeve 29 is restricted as to movement by the pin 42 carried by the stud 28 which operates in the slot 43 in the sleeve.

Mounted on the table 3 adjacent each set of the articulated arms 20 and 21 is a bracket 44 supporting a vertical shaft 45. On the upper end of each shaft 45 is a gear 46, located above the table 3, and on the lower end, beneath the table 3, is a sprocket 47. The gear 46 meshes with a rack 48 which is secured to the bottom of the plate 24, and which has a shape identical to that of the plate 24. To maintain the gear 46 and rack 48 in mesh a roller 49 is mounted on a pivoted element 50 and yieldingly engages the inside surface 51 of the rack as a result of the pressure of the springs 52 which act upon the pivoted member 50.

Obviously, as the gear 46 is rotated in a manner hereinafter described the plate 24 is rotated due to meshing of the gear with the rack 48. As the plate and rack rotate the distance between the point of the rack engaging the gear and the center of the shaft 23 varies, due to the irregular shape of the rack, and the axis of the shaft 23 shifts horizontally. This horizontal shifting is permitted by the pivoted arms 20 and 21. The work pieces, which are shaped identical to the rack pass through a vertical plane which passes through the meshing teeth of the gear and the rack, and the speed of movement through this plane is constant.

Upon reference to Fig. 4 it will be noticed that the particular shape of work piece, shown by way of example, requires that the rack 48 be formed with short radius curves, and as a result of this condition, the end remote from said curves swings quite rapidly as one of these curved portions passes between the gear 46 and the roller 49. The momentum resulting causes a tendency for the rack to over-run the gear and to vibrate back and forth about the axis of the shaft 23. This is overcome to a very material extent by providing a friction means between plate 24 and its supporting arm 21.

The friction means, above referred to, comprises a friction disc 53 secured against rotation with respect to the hub portion 25 by a pin 54 and pressed into engagement with the arm 21 by springs 55. An alternative means for accomplishing the same purpose is shown in Fig. 10, wherein an over-riding clutch composed of rollers 56 and cam surfaces is interpsed between the shaft 23a and the hub portion 25a. The over-riding clutch prevents rotation of the table (24) in one direction and, therefore, when momentum thereof tends to cause the rack to over-ride the gear the clutch permits all slack between the rack and gear to be taken up and prevents retrograde rotation of the table as a result of the impact which occurs between the teeth when the slack is abruptly taken up.

The sprockets 47 are adapted to engage a chain 58, which is trained over an idle sprocket 59 and a driving sprocket 60. As may be seen in Fig. 6, the sprockets 59 and 60 are located whereby the chain 58 is held out of mesh with two of the sprockets 47 in order that when the table comes to any one of its various stationary positions two of the sprockets 47 will be inoperative to rotate their respective shafts 45. The remainder of the sprockets 47 will be rotated by movement of the chain 58, only when the table 3 is stationary, however.

The driving sprocket 60 has a plurality of pawls 61 connected thereto and springs 62a press the pawls into engagement with a ratchet wheel 62 which is connected to a vertical shaft 63. The shaft 63 is constantly rotated by a motor 64 and the ratchet wheel 62 engages the pawls to rotate the sprocket 60.

When the table 3 is stationary, the sprocket 60 and chain 58 are driven through the over-riding clutch composed of the ratchet 62 and pawls 61, and the sprockets 47 which are in mesh with the chain 58 are rotated. The speed at which the Geneva movement operates is such that the shafts 45, driven by the sprockets 47 will complete slightly more than one complete revolution while the table is stationary, thus causing slightly more than one complete revolution of the work holder. After the work holder has been moved the required distance, the Geneva movement sets the table 3 in motion, and moves the table at a rate faster than that at which the chain 58 is moved by the motor 64. The sprockets 47, because of the friction opposing rotation of the work supports, remain stationary and carry the chain 58 with the table, the chain being permitted to move at a rate faster than it is ordinarily driven because of the presence of the over-riding clutch parts 61 and 62. When the table completes its movement and is locked against further movement the chain 58 again becomes operative to rotate the shafts 45.

In the present instance two work holders will always be inoperative, in order to permit loading and unloading, whereas the remainder will always be operative. Adjacent the stations which are operative are placed grinding, polishing and buffing wheels of the angularly adjustable type as indicated at 64. With work pieces of irregular channel section such as here shown different wheels are adjusted to engage different surfaces. The uppermost surfaces are contacted as the work pieces are moved to the several stations, and if both the uppermost and lowermost surfaces are to be ground, polished or buffed the holder 30 is inverted after one pass through the machine, and is passed through a second time.

A sprocket 65, supported by a spring pressed plunger 66, engages the chain 58 between the two sprockets 59 and 60, and maintains the chain in a taut condition.

It will be understood, although a particular form of work piece is here shown, that there is no restriction as to the form of work piece contemplated. The machine is capable of handling circular work pieces, and has particular utility in conjunction with all forms other than circular.

What is claimed is:

1. In apparatus of the character described, a work performing member, a work holder, means for moving said work holder into and out of operative relationship with said work performing member, means acting on the periphery of said work holder for rotating the same, and articulated means on said moving means supporting said work holder whereby its axis of rotation may shift incident to rotation.

2. In apparatus of the character described, a work performing member, a work holder, means for moving said work holder into and out of operative relationship with said work performing member, means for rotating said work holder when and only when it is in said operative position, said means controlling the peripheral speed of movement of the work holder whereby the peripheral speed is constant at a given point, and means supporting the work holder for cyclic movement of its axis of rotation in a plane transverse to the axis.

3. In apparatus of the character described, a plurality of work stations each having a work performing member, a work holder, means for moving said work holder to said work stations respectively, means supporting said work holder for cyclic movement of its axis of rotation during such rotation and in a plane transverse to the axis of rotation, means for rotating said work holder while it is located at a work station, and means for rendering the first named means operative and the second named means inoperative simultaneously.

4. In apparatus of the character described, a plurality of work holders, a plurality of work stations each having a work performing member, means for moving the work holders to said work stations successively, means for revolving the work holders while they are located at a work station, and a plurality of relatively articulated arms supporting the work holders whereby the axis of rotation may shift.

5. In apparatus of the character described, a rotatable table, articulated members mounted on said table, a work holder rotatably suspended by said articulated members pivotally attached to the table, a rack on said work holder having a shape corresponding to the contour of the work holder, a driven gear meshing with said rack, and yielding means maintaining the gear and rack in mesh.

6. In apparatus of the character described, a plurality of work stations each including a work performing member, a rotatable table, articulated members pivotally mounted on said table, a work holder rotatably supported by said articulated members, a rack on said work holder having a shape corresponding to the contour of the work holder, a gear, yielding means maintaining the gear and rack in mesh, means for intermittently moving the table to position the work holder at the work stations successively, and means for rotating said gear when the work holder is at a work station.

7. In apparatus of the character described, a plurality of work stations each including a work performing member, a rotatable table, articulated members pivotally mounted on said table, a work holder rotatably supported by said articulated members, a rack on said work holder having a shape corresponding to the contour of the work holder, a gear, yielding means maintaining the gear and rack in mesh, means for intermittently moving the table to position the work holder at the work stations successively, means for rotating said gear when the work holder is at a work station, and means opposing retrograde rotation of said work holder.

8. In apparatus of the character described, a plurality of work stations each including a work performing member, a rotatable table, articulated members pivotally mounted on said table, a work holder rotatably supported by said articulated members, a rack on said work holder having a shape corresponding to the contour of the work holder, a gear, yielding means maintaining the gear and rack in mesh, means for intermittently moving the table to position the work holder at the work stations successively, means for rotating said gear when the work holder is at a work station, and means opposing retrograde rotation of said work holder, said means comprising a friction disc between the work holder and the articulated members.

9. In apparatus of the character described, a plurality of work stations each including a work performing member, a rotatable table, articulated members pivotally mounted on said table, a work holder rotatably supported by said articulated members, a rack on said work holder having a shape corresponding to the contour of the work holder, a gear, yielding means maintaining the gear and rack in mesh, means for intermittently moving the table to position the work holder at the work stations successively, means for rotating said gear when the work holder is at a work station, and means opposing retrograde rotation of said work holder, said means comprising an over-running clutch between the work holder and the articulated members.

10. In apparatus of the character described, a rotatable table, a plurality of work holders on said table, said table being movable to present the work holders to a plurality of work stations, a sprocket connected with each work holder, a chain connecting the several sprockets, over-running means driving said chain constantly, and means for intermittently moving the table at a rate faster than the normal rate of movement of the chain.

11. In apparatus of the character described, a rotatable table, a plurality of work holders on said table, said table being movable to present the work holders to a plurality of work stations, a sprocket connected with each work holder, a chain connecting the several sprockets, over-running means driving said chain constantly, means for intermittently moving the table at a rate faster than the normal rate of movement of the chain, and means for stopping and locking the table with the work holders at work stations.

12. In apparatus of the character described, a rotatable table, a plurality of work holders on said table, said table being movable to present the work holders to a plurality of work stations, a sprocket connected with each work holder, a chain connecting the several sprockets, over-running means driving said chain constantly, means for intermittently moving the table at a rate faster than the normal rate of movement of the chain, and means for holding said chain disengaged from at least one of said sprockets when its respective work holder is at a predetermined station.

13. In apparatus of the character described, a rotatable table, means for intermittently moving said table a fraction of a revolution, a work holder, a plurality of relatively articulated arms mounted on said table rotatably supporting said work holder, and means for rotating said work holder when said table is stationary.

14. In apparatus of the character described, a rotatable table, means for intermittently moving said table a fraction of a revolution, a work holder, articulated means on said table rotatably supporting said work holder, and means for rotating said work holder when said table is stationary, said last named means acting on the periphery of said work holder whereby the peripheral speed of the work holder at the point of engagement with said means in constant.

15. In apparatus of the character described, a rotatable table, means for intermittently moving said table a fraction of a revolution, a work holder, articulated means on said table rotatably supporting said work holder, means opposing retrograde rotation of said work holder relative to said articulated means, and means for rotating said work holder when said table is stationary.

16. In apparatus of the character described, a rotatable table, means for intermittently moving said table a fraction of a revolution, a work holder, articulated means on said table rotatably supporting said work holder, and means for rotating said work holder when said table is stationary, said last named means acting on the periphery of said work holder whereby the peripheral speed of the work holder at the point of engagement with said means is constant, and means opposing retrograde rotation of said work holder relative to said articulated means.

17. In apparatus of the character described, a rotatable table, means for intermittently moving said table, means for stopping and locking said table after intermittent movements through a predetermined fraction of a revolution, a plurality of work holders on said table, a series of work stations located about said table at points corresponding to the successive locations of the work holders as they are moved with said table, means for rotating said work holders about an axis parallel to the axis of rotation of said table, and means supporting the work holders for cyclic movement of the axes of rotation of the work holders in a plane transverse to said axes, said last named means comprising arms articulated about axes parallel to the first named axes.

18. In apparatus of the character described, a rotatable table, means for intermittently moving said table, means for stopping and locking said table after intermittent movements through a predetermined fraction of a revolution, a plurality of work holders on said table, a series of work stations located about said table at points corresponding to the successive locations of the work holders as they are moved with said table, means for rotating said work holders about an axis parallel to the axis of rotation of said table, and a plurality of relatively articulated arms supporting said work holder with respect to said table whereby its axis of rotation may shift.

19. In apparatus of the character described, a rotatable table, means for intermittently moving said table, means for stopping and locking said table after intermittent movements through a predetermined fraction of a revolution, a plurality of work holders on said table, a series of work stations located about said table at points corresponding to the successive locations of the work holders as they are moved with said table, and means for rotating said work holders about an axis parallel to the axis of rotation of said table, said means for rotating the work holder comprising a driving gear and a rack on the work holder having a shape corresponding to the shape of the work holder.

20. In apparatus of the character described, a rotatable table, means for intermittently moving said table, means for stopping and locking said table after intermittent movements through a predetermined fraction of a revolution, a plurality of work holders on said table, a series of work stations located about said table at points corresponding to the successive locations of the work holders as they are moved with said table, means for rotating said work holders about an axis parallel to the axis of rotation of said table, and means supporting said work holder with respect to said table whereby its axis of rotation may shift, said means for rotating the work holder comprising a driving gear and a rack on the work holder having a shape corresponding to the shape of the work holder.

GUSTAVE A. CARLSON.